(12) United States Patent
Epp

(10) Patent No.: US 10,508,420 B2
(45) Date of Patent: Dec. 17, 2019

(54) SYSTEM AND METHOD FOR EFFECTIVE USE OF A LOW-YIELD WELL

(71) Applicant: Kevin Epp, Brush Prairie, WA (US)

(72) Inventor: Kevin Epp, Brush Prairie, WA (US)

(*) Notice: Subject to any disclaimer, the term of this patent is extended or adjusted under 35 U.S.C. 154(b) by 22 days.

(21) Appl. No.: 15/329,371

(22) PCT Filed: Jul. 27, 2015

(86) PCT No.: PCT/US2015/042294
§ 371 (c)(1),
(2) Date: Jan. 26, 2017

(87) PCT Pub. No.: WO2016/018824
PCT Pub. Date: Feb. 4, 2016

(65) Prior Publication Data
US 2017/0226719 A1 Aug. 10, 2017

Related U.S. Application Data

(60) Provisional application No. 62/029,692, filed on Jul. 28, 2014.

(51) Int. Cl.
*E03B 3/15* (2006.01)
*E03B 3/08* (2006.01)
(Continued)

(52) U.S. Cl.
CPC .................. *E03B 3/15* (2013.01); *E03B 3/08* (2013.01); *E03B 3/12* (2013.01); *E03B 5/02* (2013.01);
(Continued)

(58) Field of Classification Search
CPC .... E21B 43/121; E21B 47/0007; E21B 47/06; E03B 3/15; E03B 3/12; G05D 7/0676
See application file for complete search history.

(56) References Cited

U.S. PATENT DOCUMENTS 2,239,612 A * 4/1941 Lawlor .................. C02F 1/645
137/593
3,274,940 A * 9/1966 Cottrell .................. E21B 43/12
417/12
(Continued)

FOREIGN PATENT DOCUMENTS

CA 2877697 A1 * 1/2014 ............ E21B 21/08
DE 19720511 11/1998
(Continued)

*Primary Examiner* — Jennifer H Gay
(74) *Attorney, Agent, or Firm* — Rylander & Associates, PC; Philip R. M. Hunt

(57) ABSTRACT

A system and method for operating a low-yield well. The method starts with a pressure transducer telling a control box that a storage tank is low on water. The controller then activates the well pump, the water then flows up a pipe past a pressure transducer showing the back pressure, through a regulator and into the storage tank. The controller is constantly monitoring the tank level and the back-pressure level to indicate when to turn off the well to either stop from over filling the storage tank, or over pumping the well. The controller makes adjustments dependent on the back pressure (which indicates the level of water left in the well) and determines how long to withdraw water and how long to wait until the water can be withdrawn again. The system prevents pumping the well dry, and keeps the pump and well in good operating condition.

14 Claims, 10 Drawing Sheets

(51) Int. Cl.
*E03B 3/12* (2006.01)
*E03B 5/02* (2006.01)
*E03B 5/04* (2006.01)
*E03B 11/02* (2006.01)
*E21B 43/12* (2006.01)
*E21B 47/00* (2012.01)
*E21B 47/06* (2012.01)
*G05D 7/06* (2006.01)

(52) U.S. Cl.
CPC .............. *E03B 5/04* (2013.01); *E03B 11/02* (2013.01); *E21B 43/121* (2013.01); *E21B 47/0007* (2013.01); *E21B 47/06* (2013.01); *G05D 7/0676* (2013.01); *Y02A 20/106* (2018.01); *Y02A 20/116* (2018.01); *Y02A 20/118* (2018.01)

(56) References Cited

U.S. PATENT DOCUMENTS

| | | | | | |
|---|---|---|---|---|---|
| 4,118,148 | A | * | 10/1978 | Allen | E21B 47/0008 417/12 |
| 4,180,374 | A | * | 12/1979 | Bristow | F04D 15/0218 417/12 |
| 4,329,120 | A | | 5/1982 | Walters | |
| 4,461,157 | A | | 7/1984 | Shapess | |
| 4,507,053 | A | * | 3/1985 | Frizzell | F04B 49/02 417/12 |
| 4,744,729 | A | * | 5/1988 | Hasten | G05D 9/12 417/12 |
| 4,781,536 | A | * | 11/1988 | Hicks | E21B 43/126 417/12 |
| 4,874,294 | A | * | 10/1989 | Karg | F04B 49/06 417/12 |
| 5,006,044 | A | * | 4/1991 | Walker, Sr. | E21B 47/0008 417/12 |
| 5,028,212 | A | * | 7/1991 | Brophey | B09C 1/002 166/66 |
| 5,035,581 | A | * | 7/1991 | McGuire | E21B 47/0007 200/84 R |
| 5,218,986 | A | * | 6/1993 | Farwell | E03B 3/08 137/14 |
| 5,222,867 | A | * | 6/1993 | Walker, Sr. | E21B 47/0008 417/12 |
| 5,580,221 | A | * | 12/1996 | Triezenberg | F04B 47/06 417/12 |
| 5,797,452 | A | * | 8/1998 | Martin | E21B 43/129 166/110 |
| 5,819,848 | A | * | 10/1998 | Rasmuson | E21B 47/0007 166/250.15 |
| 5,823,262 | A | * | 10/1998 | Dutton | E21B 43/127 166/250.15 |
| 5,901,744 | A | * | 5/1999 | Richards | E03B 5/045 137/565.34 |
| 6,077,044 | A | * | 6/2000 | Reid | E03B 11/10 417/2 |
| 6,138,750 | A | * | 10/2000 | Ford | B01D 21/245 166/312 |
| 6,817,419 | B2 | * | 11/2004 | Reid | E21B 43/00 166/369 |
| 7,380,608 | B2 | * | 6/2008 | Geier | E21B 43/129 166/369 |
| 8,032,256 | B1 | * | 10/2011 | Wolf | E03F 5/22 137/552.7 |
| 8,366,413 | B2 | * | 2/2013 | Corbeil | F04B 47/08 417/390 |
| 8,700,220 | B2 | * | 4/2014 | Ocondi | E21B 47/06 700/282 |
| 10,047,578 | B2 | * | 8/2018 | Lovorn | E21B 21/08 |
| 2004/0084178 | A1 | * | 5/2004 | Reid | E21B 43/00 166/250.15 |
| 2006/0124298 | A1 | * | 6/2006 | Geier | E21B 43/129 166/250.15 |
| 2008/0317608 | A1 | | 12/2008 | Gray | |
| 2009/0202304 | A1 | * | 8/2009 | Koide | B01D 53/1475 405/129.2 |
| 2009/0285700 | A1 | * | 11/2009 | Corbeil | E21B 43/129 417/390 |
| 2011/0060472 | A1 | * | 3/2011 | Ocondi | E21B 43/12 700/282 |
| 2011/0290562 | A1 | * | 12/2011 | Standifird | E21B 21/08 175/57 |
| 2012/0227961 | A1 | * | 9/2012 | Sehsah | E21B 21/08 166/250.07 |
| 2012/0325460 | A1 | * | 12/2012 | Lisk | E21B 43/128 166/250.01 |
| 2014/0110169 | A1 | * | 4/2014 | Santos | E21B 47/10 175/25 |
| 2015/0240579 | A1 | * | 8/2015 | Lovorn | E21B 21/08 166/373 |
| 2015/0267490 | A1 | * | 9/2015 | Nott | E21B 21/08 166/66 |
| 2015/0354326 | A1 | * | 12/2015 | Lisk | E21B 43/128 166/53 |
| 2017/0226719 | A1 | * | 8/2017 | Epp | E03B 3/15 |

FOREIGN PATENT DOCUMENTS

| | | |
|---|---|---|
| JP | H04183991 A | 6/1992 |
| JP | H07259786 A | 10/1995 |
| JP | 2003082716 | 3/2003 |
| JP | 2003082716 A | 3/2003 |
| JP | 2005222415 A | 8/2005 |
| JP | 2007237368 A | 12/2007 |
| JP | 2007327368 | 12/2007 |
| WO | 0161429 | 8/2001 |

* cited by examiner

SYSTEM AND METHOD FOR EFFECTIVE USE OF A LOW-YIELD WELL

CROSS-REFERENCE TO RELATED APPLICATION

This application claims the benefit of U.S. Provisional Application No. 62/029,692, filed 28 Jul. 2014, incorporated herein by reference.

FIELD OF THE INVENTION

The present invention relates to water well production. More particularly, the present invention relates to low-yield water wells.

BACKGROUND

A typical water well is a hollow shaft bored into the ground lined with a casing that has penetrations at the level of the water-bearing strata of the ground. The penetrations allow water to flow into the shaft that may then be pumped out of the shaft. However, in some wells the water does not enter the shaft at a rate (the re-fill rate) sufficient for the peak usage needed by their users. When the rate at which water is extracted from the well shaft exceeds the rate at which water enters the shaft from the strata, the water level in the shaft will get lower and lower. Eventually, the water level may drop to the bottom of the shaft and the well is said to have "dried up", at least temporarily. Running a well dry or nearly dry can damage the pump, which typically is designed to have water for cooling and lubrication. Running a well dry or nearly dry can be bad for the well in other ways. When the water level in the shaft is below the water table level in the adjacent strata, sediment is more likely to enter the shaft. The action of continual over pumping can result in deterioration of water production over time.

What is needed is a system and method to effectively use a well for which the usage rate often exceeds the re-fill rate.

SUMMARY

By using an engineered control and monitoring strategy, a low-yield well optimizing system is able to provide owners of low-yield water wells with increased production of their existing water supply. This system and method can be implemented without substantial modification to the existing low-yield well. This system is engineered for wells that are not producing enough water on demand and are being pumped dry during peak usage times. The system can pump off and on 24 hours a day to claim all the water production as it is available from the low-yield well, and then send it to the house as needed to cover peak usage. The use of pressure transducers gives an ability to change input levels and data to our program. For example this can give a family the ability to live on a ¼ of a gallon of water per minute, or add a fire sprinkler system from an existing well without the cost and risk of drilling a new well.

The method starts with a pressure transducer telling a control box that a storage tank(s) is/are low on water. The controller then activates the well pump(s), the water then flows up a pipe past a pressure transducer showing the back pressure, through a regulator and into the storage tank(s). The controller is constantly monitoring the tank(s) level(s) and the back-pressure level to indicate when to turn off the well to either stop from over filling the storage tank, or over pumping the well. This is the point where the "intelligent" controller makes adjustments dependent on the back pressure (which indicates the level of water left in the well) and determines how long to withdraw water and how long to wait until the water can be withdrawn again. This will vary depending on the need for the water in tanks and the availability of water in well. The system is designed to prevent pumping the well dry, and keep the pump and well in good operating condition. If the water in the well gets to low, the controller will shut down the pump and wait a specified amount of time to restart the pumping process. At the same time, the system is monitoring the pressure of the water to the end user and running the booster pump(s) as necessary to maintain the proper pressure, as long as there is a sufficient amount of water in the storage tank(s) to do so. If the water in the storage tank(s) is/are too low the booster pump(s) will wait until the minimum water level is reached to restart the booster pump(s). There is also a failsafe overflow cut off switch at the top of the storage tank(s) to stop any possibility of over filling due to any malfunction of system.

BRIEF DESCRIPTION OF THE DRAWINGS

The present invention will be described by way of first embodiments, but not limitations, illustrated in the accompanying drawings in which like references denote similar elements, and in which.

The accompanying drawings, which are incorporated into and constitute a part of this specification, illustrate one or more embodiments of the invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference.

Those skilled in the art will recognize that numerous modifications and changes may be made to the first embodiment(s) without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the first embodiment(s) is essential. Other embodiments are possible, their specific designs depending upon the particular application. As such, the scope of the invention should not be limited by the particular embodiments herein described but should be defined only by the appended claims and equivalents thereof.

First Embodiment of a Low-Yield Well Pumping System

Figure 1A:
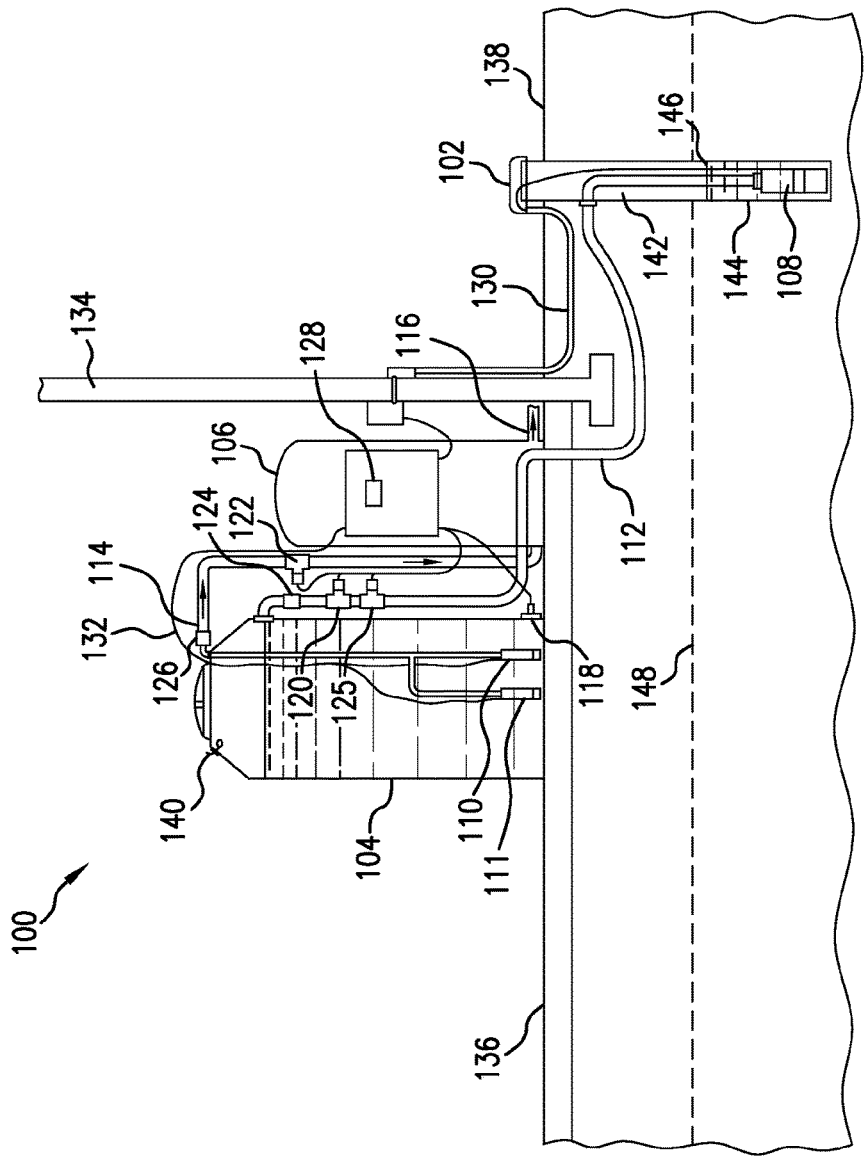
FIG. 1A shows a first embodiment of a low-yield well pumping system with a single well and single storage tank.

FIG. 1A shows a first embodiment of a low-yield well pumping system 100. The low-yield well pumping system 100 comprises a well 102, a storage tank 104, a pressure tank 106, and a control panel 128. The storage tank 104, pressure tank 106 and control panel 128 are typically placed inside a building for protection from the environment, with water and electrical connections to the well 102 penetrating the building wall 134 and building floor 136.

The well 102 comprises a well shaft 142 sunk into the ground 138 to below the water table level 148. The well shaft 142 is lined with a well casing 144 that has penetrations below the water table level 148 to allow water to flow into the well shaft 142 from the adjacent ground strata. The well 102 has a well pump 108 inside the well shaft 142. Well pump wiring 130 connects the well pump 108 to the control panel 128 and provides power to the well pump 108. Well output piping 112 connects the well pump 108 to the storage tank 104 and provides a channel for water to flow from the well pump 108 to the storage tank 104.

The well output piping 112 connects into the storage tank 104 near the top of the storage tank 104 so that the water level in the storage tank 104 does not affect the flow rate and back pressure in the well output piping 112. The well output piping 112 has a well back pressure transducer 120 and a flow detector 125 in line. The flow detector 125 sends an electrical signal to the control panel 128 with information about whether a minimal level of flow is detected or not. The well back pressure transducer 120 sends an electrical signal to the control panel 128 with information about the pressure in the well output piping 112 at the well back pressure transducer 120. The well output piping 112 has a flow regulator 124 in line and downstream from the well back pressure transducer 120. The flow regulator 124 provides for a uniform flow rate in the well output piping 112 upstream of the flow regulator 124, which insures that the pressure at the well back pressure transducer 120 does not change due to changes in flow rate. Without the flow regulator 124, pressure in the well output piping 112 at the well back pressure transducer 120 would change due to changes in flow rate, even if the back pressure at the well pump 108 remained constant.

The storage tank 104 has a storage tank level transducer 118 in the bottom of the storage tank 104. The storage tank level transducer 118 sends an electrical signal to the control panel 128 with information about the pressure in the storage tank 104 at the storage tank level transducer 118. The storage tank 104 is unpressurized, venting to the atmosphere directly by open communication. The pressure information sent by the storage tank level transducer 118 can be used by the control panel 128 to determine the level of water in the storage tank 104. The storage tank 104 has an overflow safety switch 140 that when triggered, causes the control panel 128 to turn off the well pump 108. Overflow safety switch 140 is a failsafe. Normally, information from the level transducer 118 is what the control panel 128 uses to tell the well pump 108 when to stop.

The storage tank 104 has a first booster pump 110 located at or near the bottom of the storage tank 104. The first booster pump 110 is positioned and configured to take in water from at or near the bottom of the storage tank 104, increasing the pressure and sending out through storage tank output piping 114 to the pressure tank 106. The first booster pump 110 is connected to the control panel 128 by booster pump wiring 132, which provides power to the first booster pump 110.

The storage tank output piping 114 has a check valve 126 which is configured to allow water to flow from the storage tank 104 to the pressure tank 106, but not back. This allows the pressure tank 106 to maintain a higher pressure than the storage tank 104, even when the first booster pump 110 is not running. The storage tank output piping 114 has a pressure tank transducer 122 in line. The pressure tank transducer 122 is electrically connected to the control panel 128 and sends information regarding the pressure measured in the storage tank output piping 114 at the pressure tank transducer 122. When the first booster pump 110 is not running and the check valve 126 is shut, the pressure at the pressure tank transducer 122 is the same as the pressure in the pressure tank 106. When the first booster pump 110 is on, the pressure at the pressure tank transducer 122 is slightly higher than the pressure in the pressure tank 106, but the difference is not significant if the length of storage tank output piping 114 between the pressure tank transducer 122 and the pressure tank 106 is relatively short. In some embodiments, the pressure tank transducer 122 could be place directly into the pressure tank 106, but in most embodiments it is more convenient to put the pressure tank transducer 122 in the storage tank output piping 114 as close to the pressure tank 106 as is convenient.

The pressure tank 106 has an internal air bladder configured for maintaining pressure on any water in the pressure tank 106. The booster pump 110 pushes water into the pressure tank 106, compressing the air in the bladder. After the booster pump 110 turns off, the air bladder maintains the pressure in the pressure tank 106. A pressure tank output piping 116 connects to the pressure tank 106 and carries water to an end user. When valves downstream in the pressure tank output piping 116 are opened, the pressure exerted from the air bladder forces water out of the pressure tank 106 through the pressure tank output piping 116. As the air bladder expands, the pressure in the pressure tank 106 drops. If the control panel 128 receives information from the pressure tank transducer 122 that pressure in the pressure tank 106 has decreased to below a first tank pressure value, the control panel 128 starts a booster pump.

Second Embodiment of a Low-Yield Well Pumping System

Figure 1B:
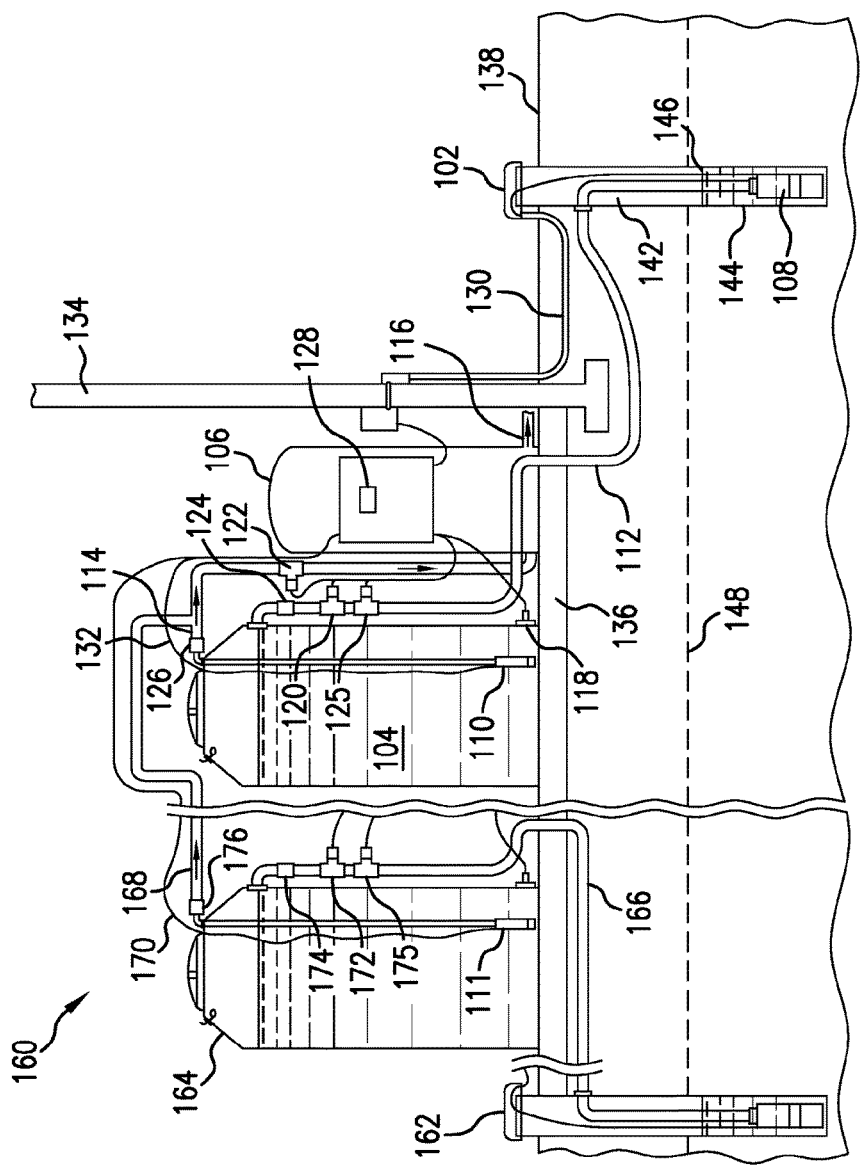
FIG. 1B shows a second embodiment of a low-yield well pumping system with multiple wells and multiple storage tanks.

FIG. 1B shows a second embodiment of a low-yield well pumping system 160. The second embodiment low-yield well system 160 comprises all the components of the first embodiment low-yield well pumping system 100 and additionally has a second well 162, a second storage tank 164, second well output piping 166 and second storage tank output piping 168. The second storage tank output piping 168 connects into the storage tank output piping 114 downstream of the check valve 126 in the storage tank output piping 114. In the second embodiment low-yield well system 160, the first storage tank 104 has first booster pump 110 therein and the second storage tank 164 has the second booster pump 111. Second booster pump wiring 170 connects second booster pump 111 to the control panel 128. A second check valve 176 serves to maintain pressure in the pressure tank 106 when the second booster pump 111 is off. A second well back pressure transducer 172, and second flow regulator 174, are associated with the second well 162 and perform similar functions as their counterparts for the first well 102. Alternative embodiments may have multiple storage tanks with one or more of the multiple storage tanks having two or more booster pumps.

In yet other embodiments, a third or even more storage tanks can be added. In some embodiments these multiple storage tanks are separate and are only cross-connected in the storage tank output piping 114, but in other embodiments, the multiple storage tanks are cross-connected directly at a low level so that the multiple storage tanks share a common water level. Each of the multiple storage tanks may have their own well pump or may share one or more well pumps.

Third Embodiment of a Low-Yield Well Pumping System

Figure 1C:
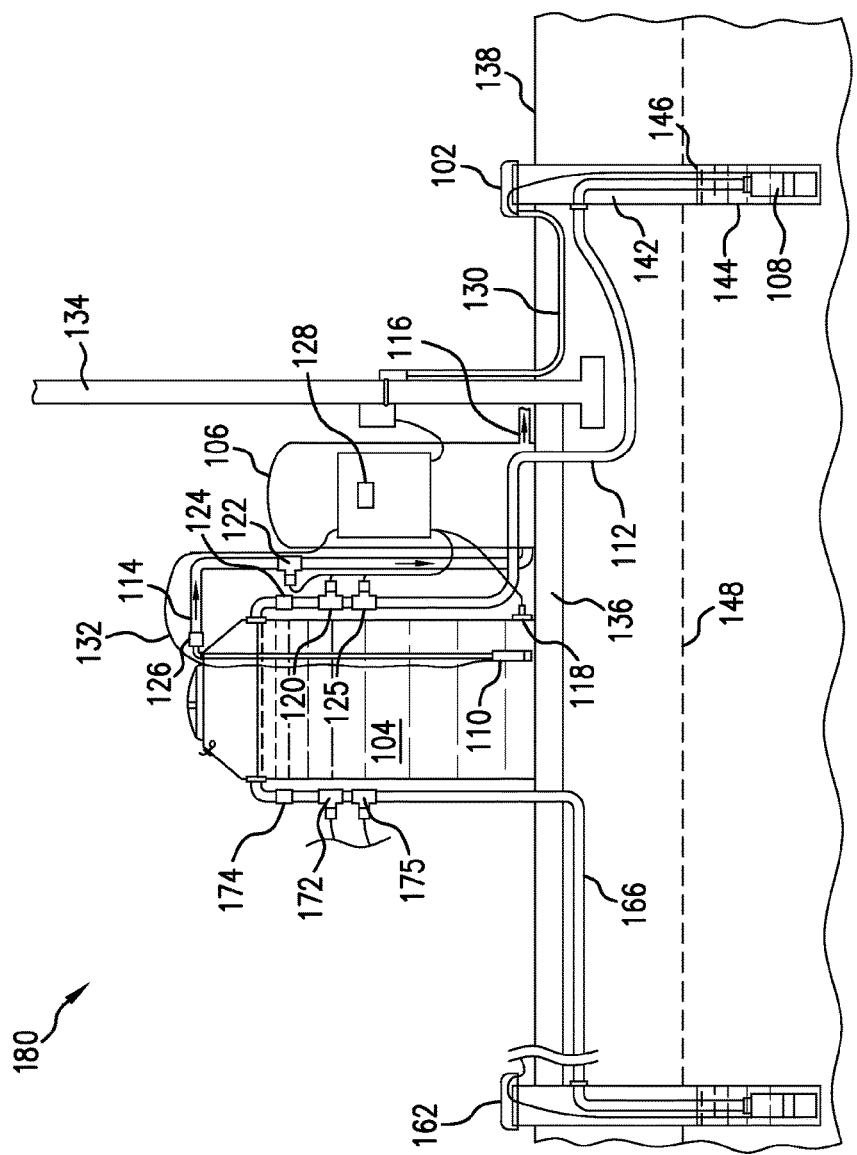
FIG. 1C shows a second embodiment of a low-yield well pumping system with multiple wells and a single storage tank.
Figure 2A:
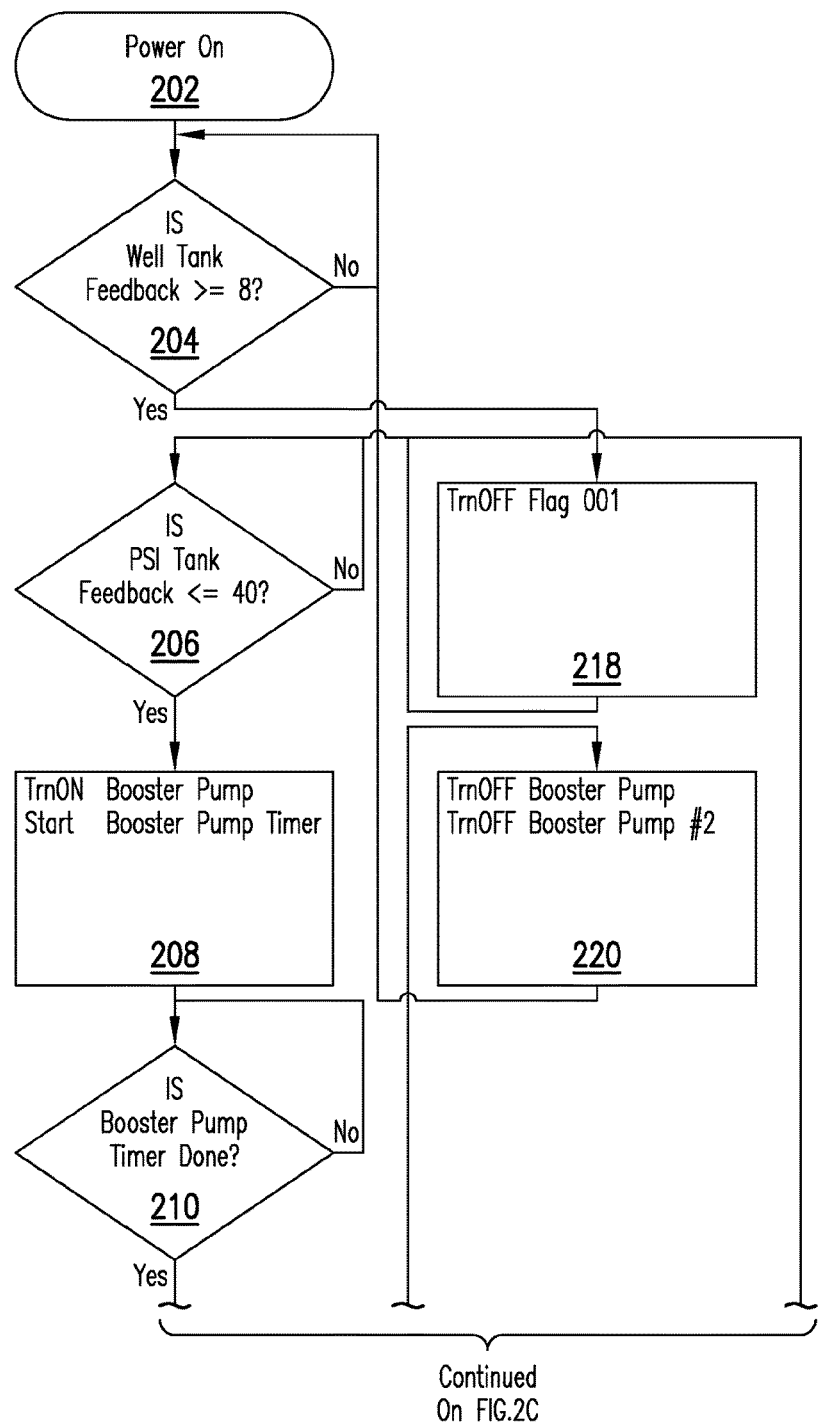
FIG. 2 shows a flow chart for an exemplary booster pump method.
Figure 2B:
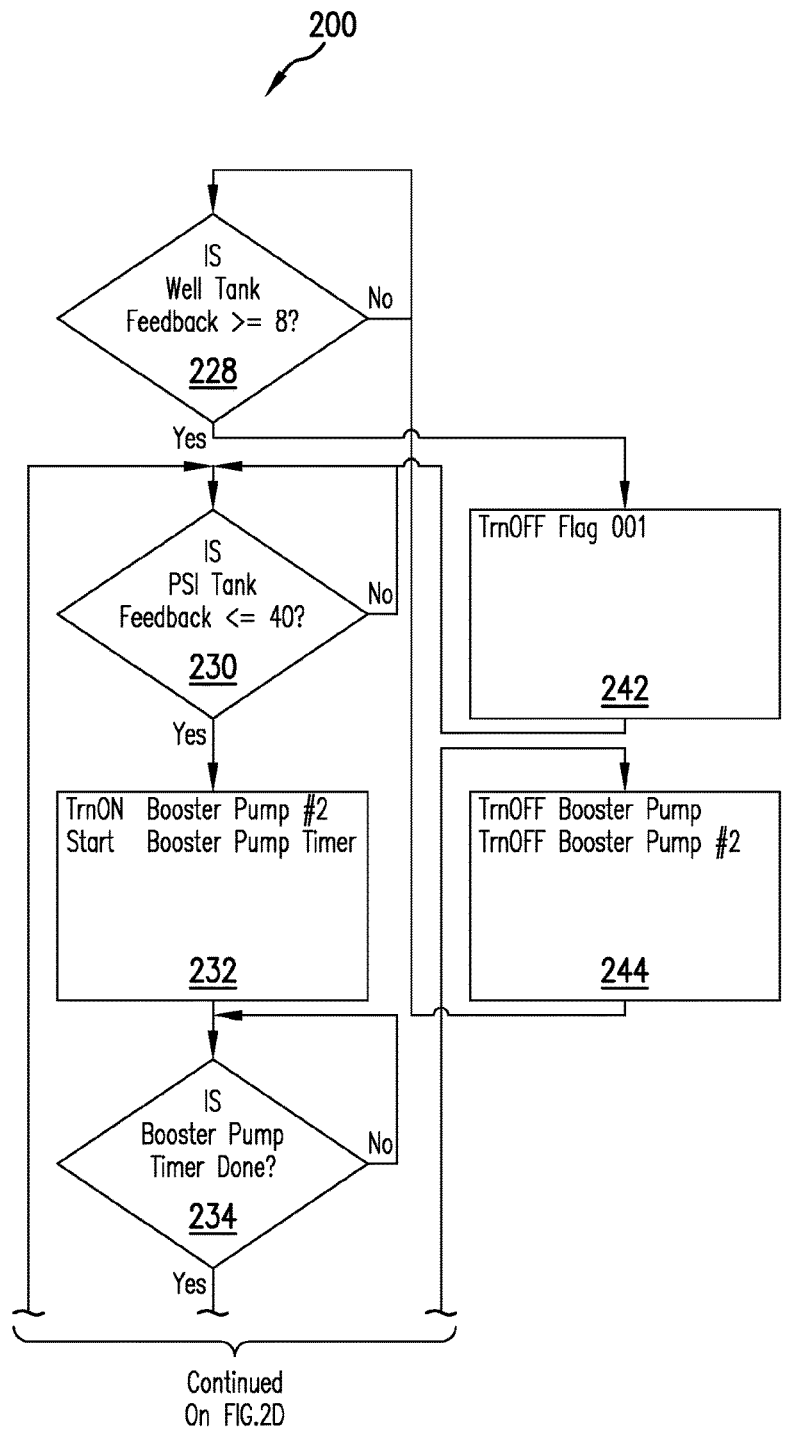
Figure 2C:
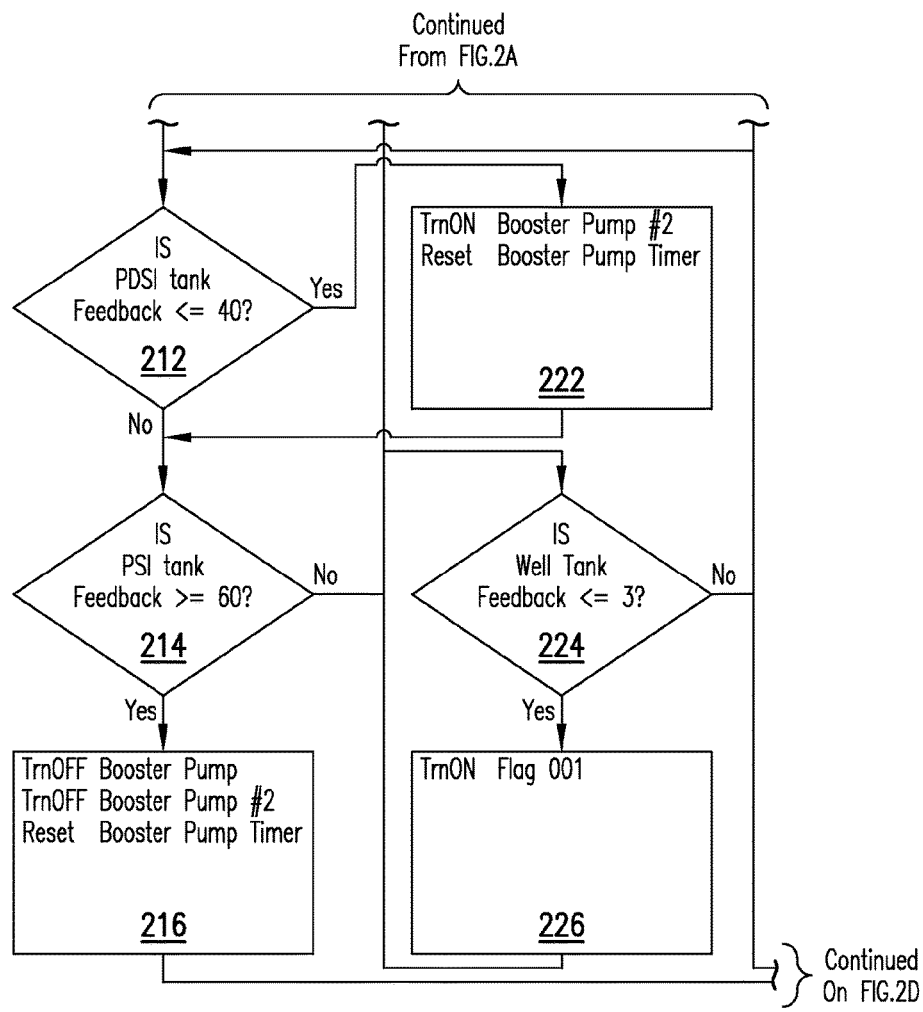
Figure 2D:
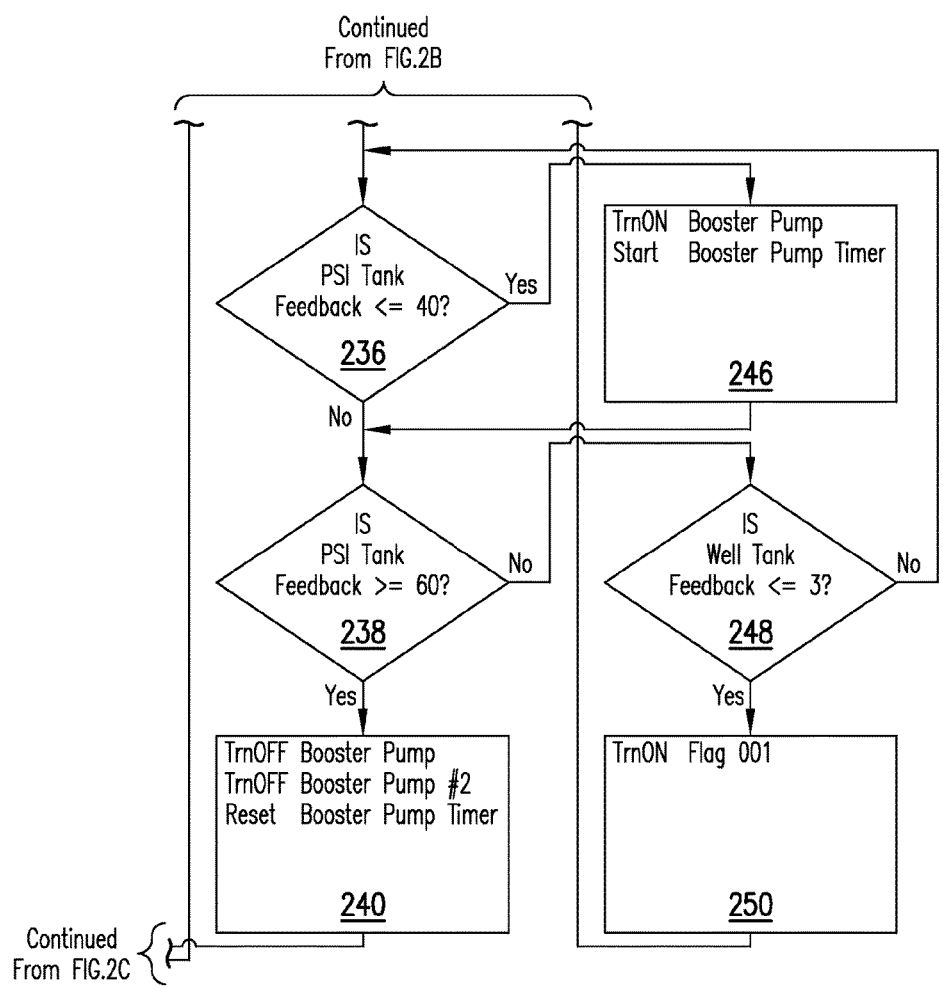

FIG. 1C shows a second embodiment of a low-yield well pumping system 180. The third embodiment of a low-yield well system 180 comprises all the components of the first embodiment low-yield well pumping system 100 and like the second embodiment 160 has a second well 162 and second well output piping 166. However, in the third embodiment of a low-yield well system 180, the second well output piping 166 connects into the same storage tank 104 as does the first well 102. A second well back pressure transducer 172, and second flow regulator 174, are associated with the second well 162 and perform similar functions as their counterparts for the first well 102. Alternative embodiments may have multiple storage tanks are cross-connected directly at a low level so that the multiple storage tanks share a common water level. One or more of the multiple storage tanks have one or more booster pumps, all connecting into a common storage tank output piping 114.

Exemplary Method for Operation of Low-Yield Well Pumping System

Figure 3A:
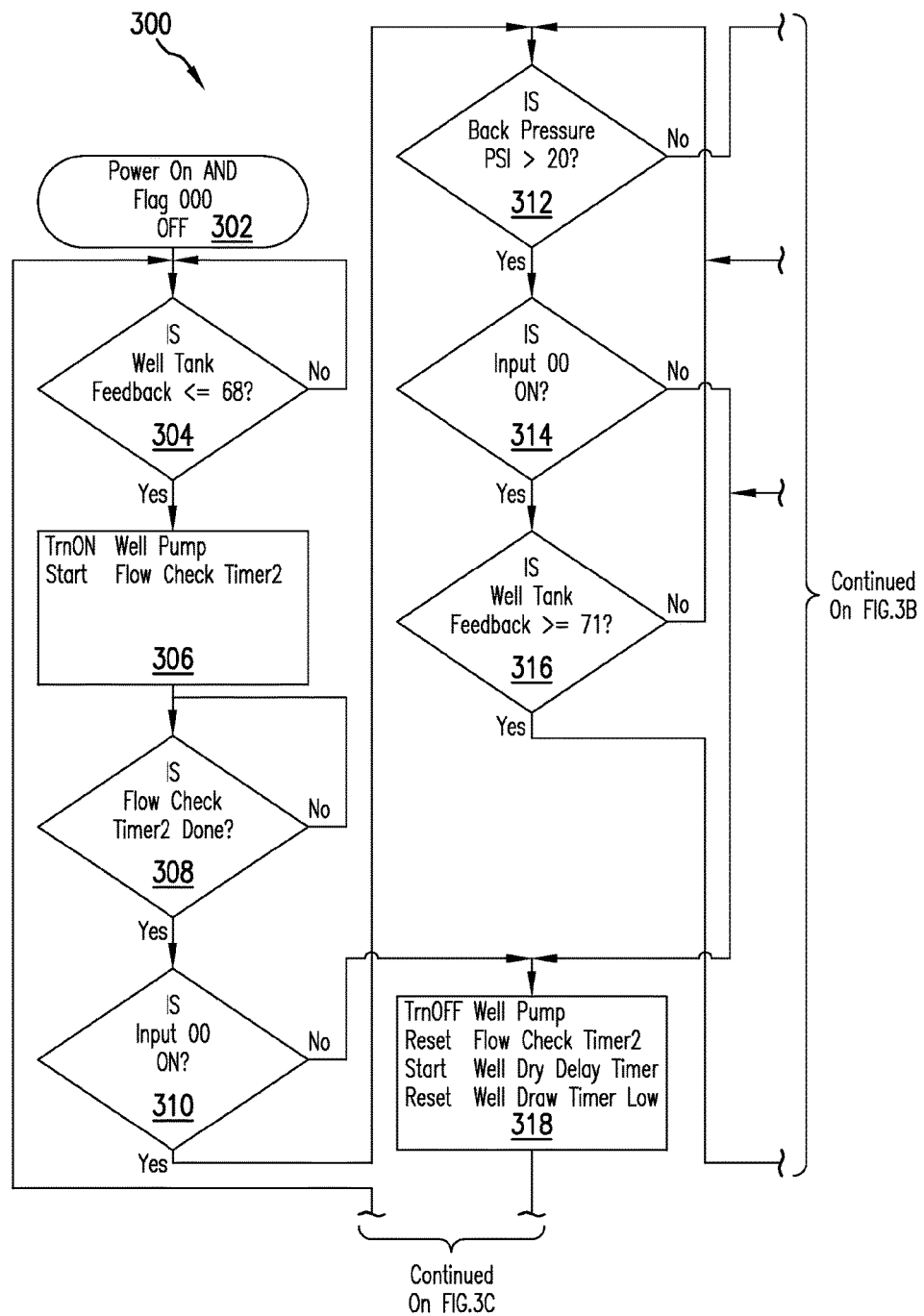
FIG. 3 shows a flow chart for an exemplary well pump method.
Figure 3B:
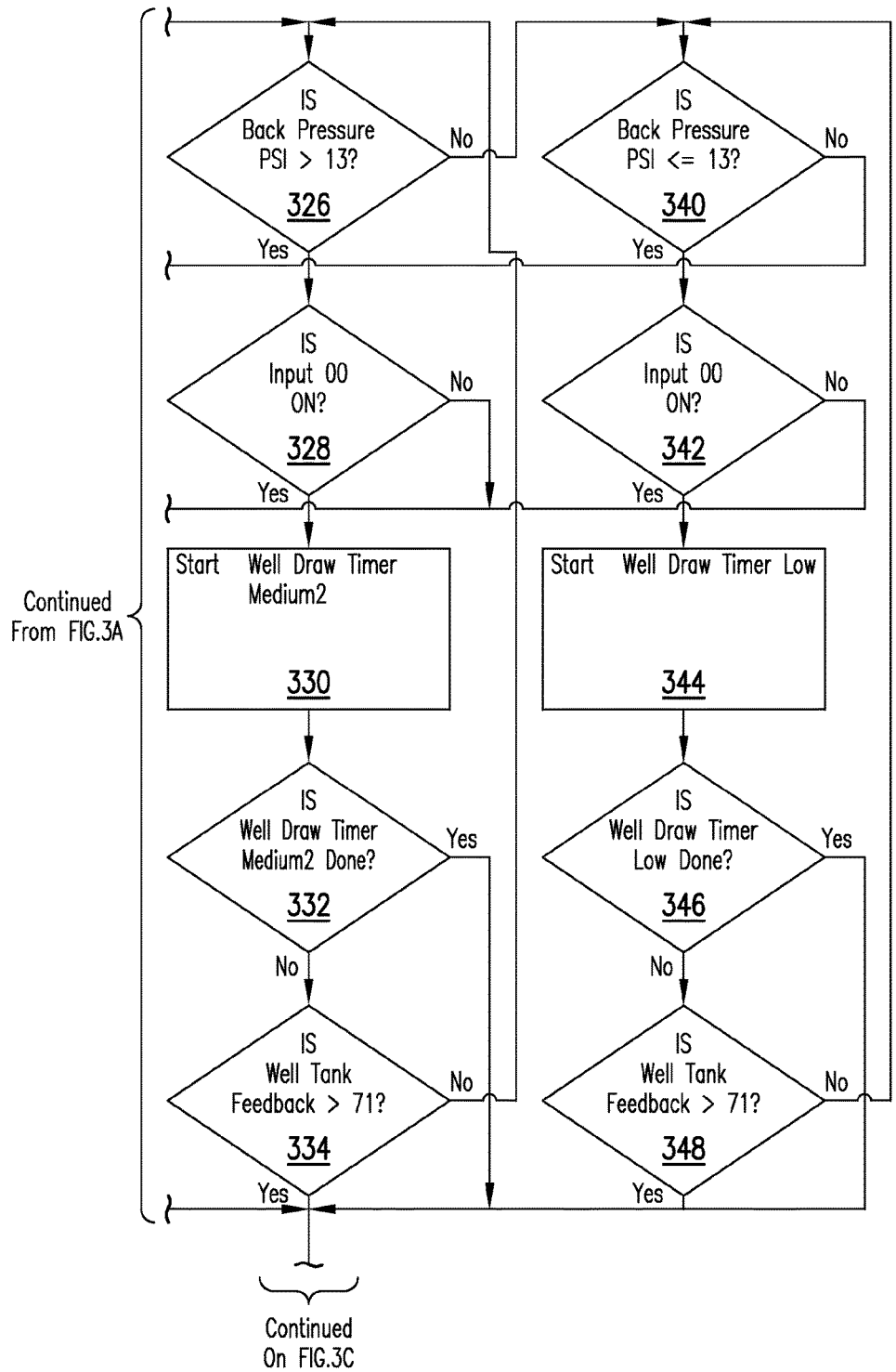
Figure 3C:
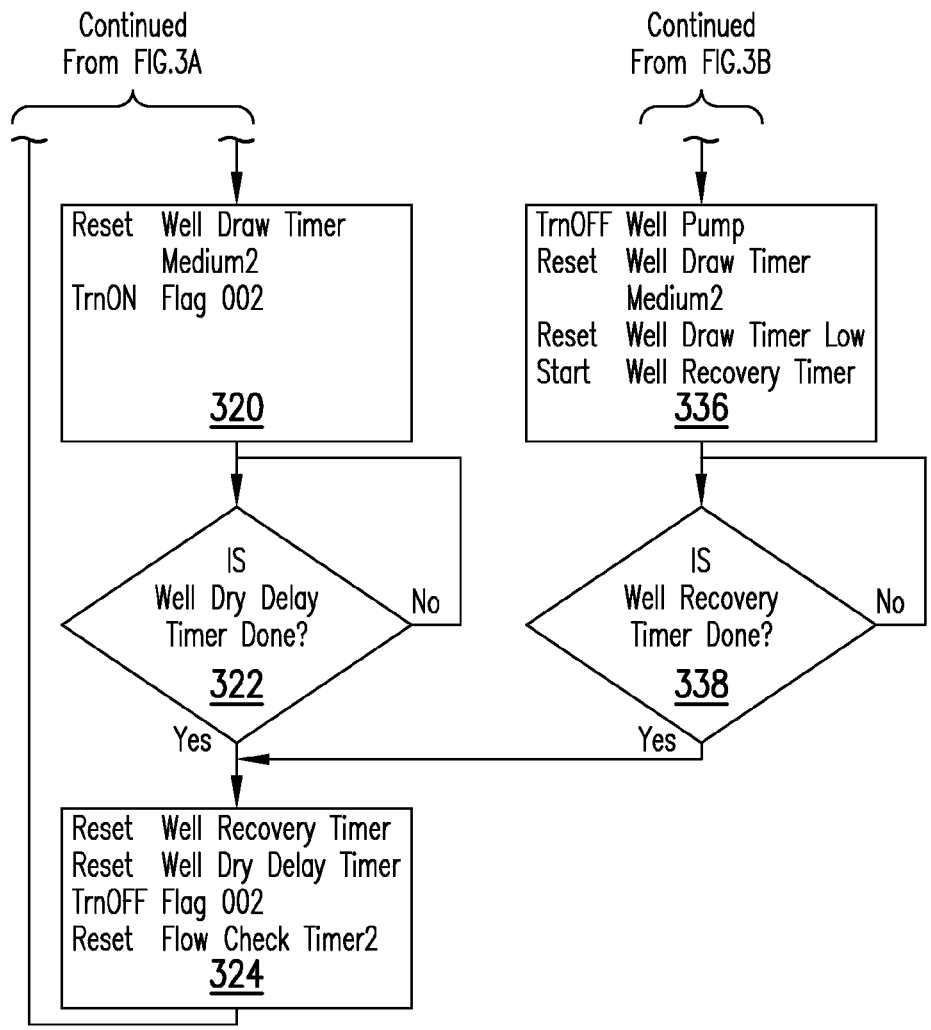

FIGS. 2-3 shows flow charts for exemplary methods for operation of the embodiment of low-yield well pumping system 100 shown in FIG. 1A and may be applicable to similar embodiments and systems. FIG. 2 shows a flow chart for an exemplary booster pump method 200. FIG. 3 shows a flow chart for an exemplary well pump method 300. All of these methods may be performed simultaneously or near simultaneously.

The booster pump method 200 shown in FIG. 2 starts with step 202, which is a step for turning on power for the control panel 128. The booster pump method 200 continues with step 204, which is a decision block for testing the whether well tank feedback (the level of the storage tank 104) is greater than or equal to a first tank level. The control panel 128 receives information from the storage tank level transducer 118 from which it derives tank level information. In the exemplary booster pump method 200, the value of the first tank level is 8 inches, but may have a different value in other embodiments and will likely vary depending on the size and shape of the storage tank 104. If the answer to the test of step 204 is no, the booster pump method 200 loops back and repeats step 204. If the answer to the test of step 204 is yes, then the booster pump method 200 proceeds to step 218. The effect of this is that unless the storage tank 104 is greater than or equal to a first tank level, the rest of the booster pump method 200 will not be performed and the booster pump(s) will not be run.

In step 218, a first flag (Flag 001) is turned off. The first flag turned off indicates that the storage tank 104 has sufficient water in it to run the booster pump(s). The booster pump method 200 then proceeds to step 206.

Step 206 is a decision block for testing whether PSI tank feedback (the pressure of the pressure tank 106) is greater than or equal to a first tank pressure. In the exemplary booster pump method 200, the value of the first tank pressure is 40 PSI, but may have a different value in other embodiments. If the answer to the test of step 206 is no, the booster pump method 200 loops back and repeats step 206. If the answer to the test of step 206 is yes, then the booster pump method 200 proceeds to step 208.

Step 208 is a performance block for turning on the first booster pump 110 and starting a booster pump timer. In the first embodiment, the value of the booster pump timer is 5 seconds, but may have other values in other embodiments. The booster pump method 200 then proceeds to step 210.

Step 210 is a decision for testing the booster pump timer has timed out. If the answer to the test of step 208 is no, the booster pump method 200 loops back and repeats step 208. If the answer to the test of step 208 is yes, then the booster pump method 200 proceeds to step 212. The effect of steps 208 and 210 is to ensure that the first booster pump 110 runs for at least a short amount of time before testing whether to stop, preventing rapid on/off cycles.

Step 212 is a decision block for testing whether PSI tank feedback (the pressure of the pressure tank 106) is less than or equal to the first tank pressure. In the exemplary method, the value of the first tank pressure is 40 PSI, but may have other values in other embodiments. If the answer to the test of step 212 is no, the booster pump method 200 proceeds to step 214. If the answer to the test of step 206 is yes, then the booster pump method 200 proceeds to step 222. The effect of step 212 is that after running the booster pump 104 for a short period of time (determined by the value of booster pump timer), if the pressure of the pressure tank 106 is below the first tank pressure, then the second booster pump 111 is started to assist the first with additional flow of water to the pressure tank 106.

Step 222 is a performance block for turning on the second booster pump 111 and resetting the booster pump timer. The booster pump method 200 then proceeds to step 214. Steps 212 and 222 are included in the booster pump method 200 only if the low-yield well pumping system 100 has a second booster pump 111 in the storage tank 104 or another storage tank (not shown).

Step 214 is a decision block for testing whether PSI tank feedback (the pressure of the pressure tank 106) is greater than or equal to a second tank pressure. In the exemplary method, the value of the second tank pressure is 60 PSI, but may have other values in other embodiments. If the answer to the test of step 214 is no, the booster pump method 200 proceeds to step 224. If the answer to the test of step 214 is yes, then the booster pump method 200 proceeds to step 216.

Step 216 is a performance block for turning off the first booster pump 110 and the second booster pump 111 and resetting the booster pump timer. The booster pump method 200 then proceeds to step 230.

Step 224 is a decision block for testing the whether well tank feedback (the level of the storage tank 104) is less than or equal to a second tank level. In the exemplary booster pump method 200, the value of the second tank level is 3 inches, but may have a different value in other embodiments and will likely vary depending on the size and shape of the storage tank 104. If the answer to the test of step 224 is no, the booster pump method 200 loops back and repeats step 212. If the answer to the test of step 224 is yes, then the booster pump method 200 proceeds to step 226. The effect of steps 214 and 224 is that unless the storage tank 104 is less than or equal to the second tank level, or greater than the second tank pressure, then the booster pump(s) will continue to run.

Step 226 is a performance block for turning on the first flag. The first flag turned on indicates that the storage tank 104 does not have sufficient water in it to run the booster pump(s). The booster pump method 200 then proceeds to step 220.

Step 220 is a performance block for turning off the first booster pump 110 and the second booster pump 111 and resetting the booster pump timer. The booster pump method 200 then loops back to step 204.

Steps 228 through 250 are essentially the same as steps 204 through 226, except that in the second booster pump 111 is started first (in step 232) and the first booster pump 110 is started later (in step 246) rather than the first booster pump 110 starting first (in step 208) and the second booster pump 111 starting second (in step 222). Also step 240 loops back to the start of the group of steps 204 through 226. The effect of these two groups of steps is that both booster pumps are evenly used and one pump is not idled. If the usage patterns are such that only in rare circumstances would the second booster pump 111 be need, the other booster pump would be idled for long periods of time and may fail unnoticed. For example, if the second booster pump 111 is only needed to serve a sprinkler system, a silent failure of the second booster pump 111 would not be noticed until a fire triggered the sprinkler system—an undesirable result.

In FIG. 3 the well pump method 300 starts with step 302, which is a performance block for powering on the control panel 128 and for setting a second flag (Flag 000) to off. The well pump method 300 then proceeds to step 304.

Step 304 is a decision block for testing the whether well tank feedback (the level of the storage tank 104) is less than or equal to a third tank level. The control panel 128 receives information from the storage tank level transducer 118 from which it derives tank level information. In the exemplary well pump method 300, the value of the third tank level is 68 inches, but may have a different value in other embodiments and will likely vary depending on the size and shape of the storage tank 104. If the answer to the test of step 304 is no, the well pump method 300 loops back and repeats step 304. If the answer to the test of step 304 is yes, then the well pump method 300 proceeds to step 306. The effect of this is that unless the storage tank 104 is less than or equal to the third tank level, the rest of well pump method 300 will not be performed and the well pump 108 will not be run.

Step 306 is a performance block for starting the well pump 108 and a flow check timer. The well pump method 300 then proceeds on to step 308.

Step 308 is a decision block for testing whether the flow check timer has been completed. If the answer to the test of step 308 is no, the well pump method 300 loops back and repeats step 308. If the answer to the test of step 308 is yes, then the well pump method 300 proceeds to step 310. Looping until the flow check timer has expired allows time for the well pump 108 to start up and get flow going before checking on whether there is flow in step 310.

Step 310 is a decision block for testing whether the flow detector 125 (Input 00) is detecting flow from the well pump 108. If the answer to the test of step 310 is yes, then the well pump method 300 proceeds to step 312. If the answer to the test of step 310 is no, the well pump method 300 proceeds to step 318.

Step 312 is a decision block for testing whether well pump back pressure, as measured by the well back pressure transducer 120, is greater than a first back pressure. In the exemplary method, the first back pressure has a value of 20 PSI, but may be a different value in other embodiments, depending on the characteristics of the particular well pump 108, the depth of the well pump 108 and the size of the well output piping 112. If the answer to the test of step 312 is no, the well pump method 300 proceeds to step 326. If the answer to the test of step 312 is yes, then the well pump method 300 proceeds to step 314.

Step 314 is a decision block for testing whether a flow input sensor (Input 00) is detecting flow from the well pump 108. If the answer to the test of step 314 is yes, then the well pump method 300 proceeds to step 316. If the answer to the test of step 314 is no, the well pump method 300 proceeds to step 318.

Step 316 is a decision block for testing the whether well tank feedback (the level of the storage tank 104) is greater than a fourth tank level. The control panel 128 receives information from the storage tank level transducer 118 from which it derives tank level information. In the exemplary well pump method 300, the value of the fourth tank level is 71 inches, but may have a different value in other embodiments and will likely vary depending on the size and shape of the storage tank 104. If the answer to the test of step 316 is no, the well pump method 300 loops back and repeats step 312. If the answer to the test of step 316 is yes, then the well pump method 300 proceeds to step 336.

Step 318 is a performance block for stopping the well pump 108, resetting the flow check timer, starting a well dry delay timer and resetting a well draw timer (low). The well pump method 300 then proceeds on to step 320.

Step 320 is a performance block for resetting a well draw timer (medium) and turning a third flag (Flag 002) on. The well pump method 300 then proceeds on to step 322.

Step 322 is a decision block for testing whether the well dry delay timer has timed out. In the first embodiment, the well dry delay timer is 1 hour and 45 minutes, but may have different values in different embodiments, depending on how long the particular well 102 needs to recover after being pumped dry. If the answer to the test of step 322 is no, the well pump method 300 loops back and repeats step 322. If the answer to the test of step 322 is yes, then the well pump method 300 proceeds to step 324.

Step 324 is a performance block for resetting a well recovery timer, resetting the well dry delay timer, resetting the flow check timer and turning the third flag (Flag 002) off. The well pump method 300 then proceeds on to step 322.

Step 326 is a decision block for testing whether well pump back pressure, as measured by the well back pressure transducer 120, is greater than a second back pressure. The value of the second back pressure is less than the value of the first back pressure used in step 312. In the exemplary method, the second back pressure has a value of 13 PSI, but may be a different value in other embodiments, depending on the characteristics of the particular well pump 108, the depth of the well pump 108 and the size of the well output piping 112. If the answer to the test of step 326 is no, the well pump method 300 proceeds to step 340. If the answer to the test of step 326 is yes, then the well pump method 300 proceeds to step 328.

Step 328 is a decision block for testing whether a flow input sensor (Input 00) is detecting flow from the well pump 108. If the answer to the test of step 328 is yes, then the well pump method 300 proceeds to step 330. If the answer to the test of step 328 is no, the well pump method 300 proceeds to step 318.

Step 330 is a performance block for starting a well draw timer (medium). The well pump method 300 then proceeds on to step 332.

Step 332 is a decision block for testing whether the well draw timer (medium) has timed out. In the first embodiment, the medium well draw timer is set at 10 minutes, but may be set at different values for different embodiments; depending on how long a particular well pump has been found to be able to run with back pressure lower than the first back pressure value without running the well dry. If the answer to the test of step 332 is yes, the well pump method 300 proceeds to step 336. If the answer to the test of step 332 is no, then the well pump method 300 proceeds to step 334.

Step 334 is a decision block for testing the whether well tank feedback (the level of the storage tank 104) is greater than the fourth tank level. If the answer to the test of step 334 is no, the well pump method 300 loops back and repeats step 326. If the answer to the test of step 334 is yes, then the well pump method 300 proceeds to step 336.

Step 336 is a performance block for turning off the well pump 108, resetting a well draw timer (medium), resetting the draw timer (low), and starting a well recovery timer. The well pump method 300 then proceeds on to step 338.

Step 338 is a decision block for testing whether the well recovery timer has timed out. If the answer to the test of step 338 is no, the well pump method 300 loops back and repeats step 338. If the answer to the test of step 338 is yes, then the well pump method 300 proceeds to step 324. Step 338 keeps the well pump 108 shut down while the well recovery timer is timing out, allowing water to flow back into the well from adjacent strata. In the first embodiment, the well recovery timer is set at 30 minutes, but may be set at different values for different embodiments, depending on how long a particular well has been found to need to recover after a typical pumping session.

Step 340 is a decision block for testing whether well pump back pressure, as measured by the well back pressure transducer 120, is less than or equal to the second back pressure. If the answer to the test of step 340 is no, the well pump method 300 loops back to step 312. If the answer to the test of step 340 is yes, then the well pump method 300 proceeds to step 342.

Step 342 is a decision block for testing whether a flow input sensor (Input 00) is detecting flow from the well pump 108. If the answer to the test of step 342 is yes, then the well pump method 300 proceeds to step 334. If the answer to the test of step 342 is no, the well pump method 300 proceeds to step 318.

Step 344 is a performance block for starting a well draw timer (low). The well pump method 300 then proceeds on to step 346.

Step 346 is a decision block for testing whether the well draw timer (low) has timed out. In the first embodiment, the low well draw timer is set at 1 minute, but may be set at different values for different embodiments, depending on how long a particular well pump has been found to be able to run with back pressure lower than the second back pressure value without running the well dry. If the answer to the test of step 346 is no, the well pump method 300 proceeds to step 348. If the answer to the test of step 346 is yes, then the well pump method 300 proceeds to step 336.

Step 348 is a decision block for testing the whether well tank feedback (the level of the storage tank 104) is greater than the fourth tank level. If the answer to the test of step 348 is no, the well pump method 300 loops back and repeats step 340. If the answer to the test of step 348 is yes, then the well pump method 300 proceeds to step 336.

What is claimed is:

1. A system comprising:
   a well with a well pump;
   a storage tank connected to the well pump with well output piping;
   a well back pressure transducer in line with the well output piping configured to measure a well back pressure;
   a flow regulator in line with the well output piping and downstream from the well back pressure transducer, the flow regulator configured to provide for a uniform flow rate in the well output piping; and
   a control panel configured for controlling the well pump, the control panel configured for receiving well pump back pressure information from the well back pressure transducer, the control panel configured for controlling the well pump based on the well pump back pressure information.

2. The system of claim 1, further comprising:
   a flow detector in the well output piping, the flow detector configured for sending information to the control panel whether there is flow detected in the well output piping; and
   wherein the control panel is further configured for turning off the well pump if the flow detector sends information that no flow is detected, further configured for starting a well dry timer, further configured for keeping the well pump turned off until the well dry timer has timed out.

3. The system of claim 1 or 2,
   wherein the control panel is further configured for starting a medium well draw timer if well back pressure is less than a first back pressure and greater than a second back pressure, wherein the second back pressure is less than the first back pressure; and
   wherein the control panel is further configured for turning off the well pump if the medium well draw timer has timed out.

4. The system of claim 3,
   wherein the control panel is further configured for starting a low well draw timer if the well back pressure is less than the second back pressure; and
   wherein the control panel is further configured for turning off the well pump if the low well draw timer has timed out.

5. The system of claim 4,
wherein the control panel is further configured for starting a well recovery timer if either the medium well draw timer has started and timed out or the low well draw timer has started and timed out or the storage tank has been filled; and
wherein the control panel is further configured for keeping the well pump turned off until the well recovery timer has timed out.

6. The system of claim 1, further comprising:
a booster pump configured to intake from the storage tank;
a pressure tank connected to the booster pump with storage tank output piping; and
the control panel further configured to start the booster pump when pressure in the pressure tank falls below a first tank pressure.

7. A method for operating a low-yield well system comprising the steps of:
receiving well pump back pressure information at a control panel from a well back pressure transducer measuring a well back pressure upstream of a flow regulator in well output piping, the flow regulator configured to provide for a uniform flow rate in the well output piping; and
controlling a well pump based on the well pump back pressure information.

8. The method of claim 7, further comprising the steps of:
sending information from a flow detector to the control panel, the information regarding whether there is flow detected in well output piping, the flow detector positioned in output piping of the low-yield well system;
turning off the well pump if the flow detector sends information that no flow is detected;
starting a well dry timer; and
keeping the well pump turned off until the well dry timer has timed out.

9. The method of claim 7 or 8, further comprising the steps of:
starting a medium well draw timer if the well back pressure is less than a first back pressure and greater than a second back pressure, wherein the second back pressure is less than the first back pressure; and
turning off the well pump if the medium well draw timer has timed out.

10. The method of claim 9, further comprising the steps of:
starting a low well draw timer if the well back pressure is less than the second back pressure; and
turning off the well pump if the low well draw timer has timed out.

11. The method of claim 10, further comprising the steps of:
starting a well recovery timer if either the medium well draw timer has started and timed out or the low well draw timer has started and timed out or a storage tank has been filled; and
keeping the well pump turned off until the well recovery timer has timed out.

12. The method of claim 7, further comprising the steps of:
starting a first booster pump when pressure in a pressure tank falls below a first tank pressure.

13. The method of claim 12, further comprising the steps of:
starting a second booster pump when pressure in the pressure tank falls below a second tank pressure, the second tank pressure lower than the first tank pressure.

14. The method of claim 13, further comprising the steps of:
stopping the first booster pump and the second booster pump;
starting the second booster pump when pressure in the pressure tank falls below the first tank pressure for a second time; and
starting the first booster pump when pressure in the pressure tank falls below the second tank pressure for a second time.

* * * * *